United States Patent [19]

Hans

[11] 3,829,163

[45] Aug. 13, 1974

[54] QUICK CHANGE WHEEL ASSEMBLY

[76] Inventor: Paul Hans, 706 Locust Ln., Louisville, Ky. 40213

[22] Filed: Apr. 4, 1973

[21] Appl. No.: 347,653

[52] U.S. Cl. ............... 301/9 DN, 29/424, 29/458, 85/72, 151/41.7, 151/69, 301/63 R
[51] Int. Cl. ............................................ B60b 3/14
[58] Field of Search ............ 301/9 DN, 36 R, 63 R; 151/41.73, 41.74, 41.7, 69; 29/458, 459, 418, 424, 423; 85/62, 72

[56] References Cited
UNITED STATES PATENTS

| 1,928,068 | 9/1933 | Michelin | 301/9 DN |
|---|---|---|---|
| 3,074,134 | 1/1963 | Buechler | 85/72 |
| 3,462,114 | 8/1969 | O'Dell | 151/41.73 |
| 3,679,266 | 7/1972 | Jenkins | 301/9 DN |
| 3,711,347 | 1/1973 | Wagner | 151/14.74 |
| 3,742,583 | 7/1973 | Devlin | 29/458 |

FOREIGN PATENTS OR APPLICATIONS

| 2,026,332 | 12/1970 | Germany | 301/9 DN |
|---|---|---|---|
| 653,957 | 10/1963 | Belgium | 85/72 |

Primary Examiner—Robert S. Ward, Jr.
Assistant Examiner—Reinhard J. Eisenzopf
Attorney, Agent, or Firm—Donald L. Cox

[57] ABSTRACT

A quick change wheel assembly is disclosed comprising in combination a wheel sleeve, a lug nut, and a bullet nosed stud. The bullet nosed stud is attached to the wheel hub and has a threaded shank portion having threads engageable with the lug nut and bullet nosed section of diameter smaller than the diameter of the lug nut threads. The wheel sleeve is inserted into the holes in the wheel disc, has a raised shoulder with a conical receiving section and has at the opposite end from said raised shoulder a second conical receiving section which is flared to hold the sleeve in place on the wheel disc. The threaded lug nut for receiving the stud has one end corresponding to the shape of the conical receiving end of the raised shoulder and said nut is attached to the sleeve at the conical receiving section by means of a weak glue.

2 Claims, 3 Drawing Figures

PATENTED AUG 13 1974 3,829,163

INVENTOR  PAUL HANS
ATTORNEY

QUICK CHANGE WHEEL ASSEMBLY

BACKGROUND OF INVENTION

In the auto racing industry, the speed with which tire changes may be accomplished during the course of the race often determines the winner of the race. Time margins of as small as 1 to 4 seconds have often been the difference between a winning car and a losing car.

One type of wheel assembly which has been utilized involves a single quick change lug whereby the wheel is attached through its center to the hub by means of a single spinner. In stock car racing, however, wheels attached by from three to six lug nuts are preferred. Where a wheel is removed and replaced with a new wheel, it is often difficult, if not impossible, to quickly line up wheel studs with the wheel lug openings and the lug nuts.

SUMMARY OF INVENTION

By combining the inventor's bullet nosed studs, lug nuts, and wheel sleeves as disclosed herein, it is possible to quickly change tires during the course of a race and save the race driver from 3 to 10 seconds on each pit stop. Basically, the instant invention involves a wheel comprising a wheel disc which is formed having holes through which the stud of the instant invention may pass. The wheel is secured onto the wheel stud by means of a lug nut which is axially tightened. Inserted in each of the holes in the wheel disc is a wheel sleeve comprising a raised shoulder section and a smaller diameter section which may be inserted directly into the wheel. Both ends of the wheel sleeve are equipped with a conical receiving sections. The conical receiving section for the smaller diameter portion of the sleeve is flared out to hold the sleeve in the wheel disc. The interior diameter of the wheel sleeve is such that the studs utilized may pass easily through the interior of the sleeves.

The lug nut as contemplated herein is similar to well-known lug nuts used on automobile wheels but one end is equipped with a raised pyramid-shaped portion which corresponds to the shape of the conical receiving end of the raised shoulder on the wheel sleeve. Thus a tight fit is permitted when the pyramid-shaped end of the lug nut is brought into contact with the conical receiving end of the raised sleeve. In the preferred operation of the instant invention the lug nut is in this manner glued to the wheel sleeve. The glue which is utilized may be easily selected, but should be of the type that is readily separable when axial forces are applied to the lug nut. In various racing conditions it may be necessary to utilize a weak thermo-setting glue rather than a thermo-plastic one, since under racing temperature conditions the thermo-plastic glue may flow out, causing contact to be lost between the lug nut and the sleeve.

In the preferred operation of the instant invention bullet nosed studs are utilized. These studs are attached to the hub of the automobile wheel (which is in turn attached to the wheel axle). The bullet nosed stud is designed having a head section which is engageable into the wheel hub, a threaded shank section having threads which are engageable with the threads on the threaded lug nut and a bullet nosed section of smaller diameter than the diameter of the lug nut threads.

In actual operation prior to the race itself the desired number of wheels are prepared by inserting the wheel sleeves of the instant invention into the magnesium wheel disc and flaring one end of the sleeve. The threaded lug nuts described herein are then glued into the conical receiving end of the raised shoulder in the wheel sleeve. During the race then when a tire change is desired the old wheel is removed and the new wheel inserted onto the wheel hub which has previously been equipped with the bullet nosed stud described here. The bullet nosed portion of the stud acts to guide the stud through the sleeves in the wheel, and through the lug nut. After the wheel is thus temporarily positioned on the hub an air wrench is attached to the lug nut and the application of axial pressure separates the lug nut from the wheel sleeve causing a tightening of the wheel onto the hub.

DETAILED DESCRIPTION OF DRAWINGS

Figure 1:
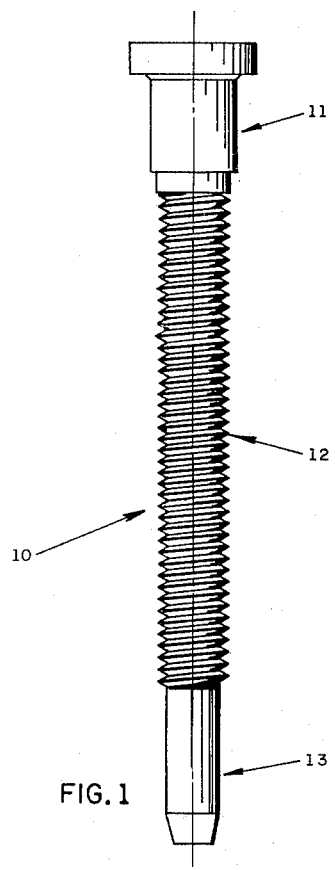
FIG. 1 shows the lug nut, sleeve, and bullet nosed studs as they are meant to fit together.
Figure 2:
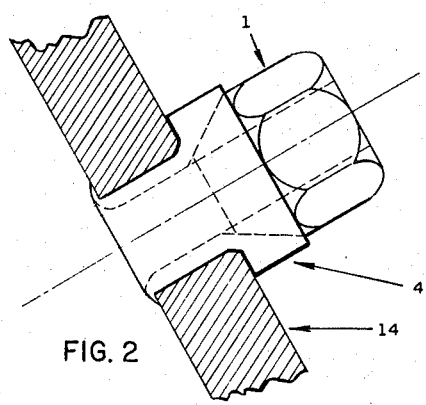
FIG. 2 shows the lug nut and sleeve assembly in place on a wheel.
Figure 3:
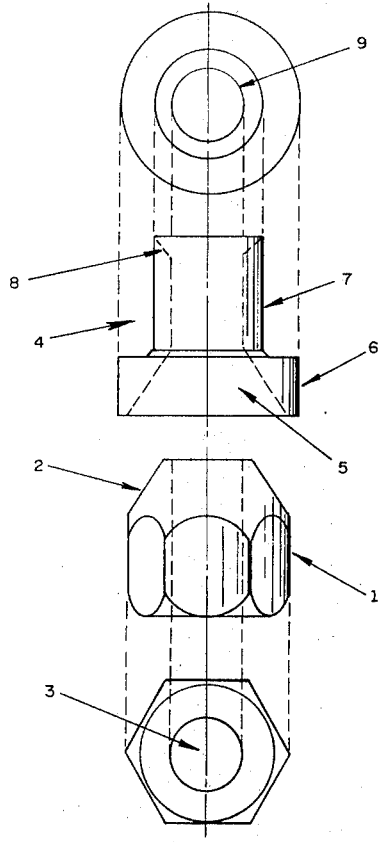
FIG. 3 shows the bullet nosed stud attached to the wheel of an automobile.

In FIG. 1, the lug nut 1 having a pyramid-shaped end 2 and defining the opening 3 for receiving the bullet nosed stud is shown. The pyramid-shaped end is designed for complimentary attachment into the conical receiving section 5 within the wheel sleeve 4. While the accompanying drawings show a conical design, it is recognized that many other forms of complimentary engagement, including dome-shapes or cylindrical-shapes having complimentary receiving ares within the sleeve are possible and may be utilized as an alternate to the instant invention. The sleeve itself has a raised shoulder section 6 and a section of smaller diameter 7. As previously stated, the sleeve is equipped with a conical receiving area for receiving the head of the lug nut. At the opposite end of the sleeve is a similar conical receiving section 8 which may be flared as shown in FIG. 2 to hold the sleeve in contact with the wheel disc. The diameter of the opening 9 and the wheel sleeve is determined by the diameter of the threads on the bullet nosed stud 10.

The bullet nosed stud 10 is equipped with a head section for engagement in the wheel hub 11, a threaded shank section 12, and a bullet nosed section of smaller diameter 13. The respective lengths of the bullet nosed portion of the shank and the head portion depend solely on the means for engagement utilized, the size of the lug nut and the size of the wheel sleeve utilized. The reduced diameter of the bullet nosed portion aids in guiding this stud through the sleeve and the lug nut to facilitate quick change of the wheels.

In operation the lug nut 1 is glued onto the conical receiving section of the sleeve 4, which has previously been inserted into the wheel disc 14. The nut is glued into the sleeve to await final application of the wheel. When the wheel is to be inserted on the wheel hub 15, the studs are lined up with the hole 9 in the wheel sleeve and the wheel forced on. Application of axial force to the lug nut breaks contact with the glue and causes the wheel to be tightened onto the hub.

The need for the sleeve member is most readily seen with the use of magnesium wheels. Although such wheels exhibit great strength in racing uses, the metal itself is relatively soft and subject to wear by friction. Therefore, a steel sleeve is needed to protect the magnesium from any movement between the stud and the wheel during the race.

The bullet nosed studs may be attached to the wheel hub by any well-known method.

I claim:

1. A wheel comprising a wheel disc formed with a plurality of elements defining holes through which studs pass and around which an axial tightening force is applied for securing the wheel on the hub the improvement comprising:

A. wheel sleeves inserted into said holes having a raised shoulder with a conical receiving section and having at the opposite end from said raised shoulder a second conical receiving section which is flared to hold the sleeve in place on said wheel and wherein said sleeve has an interior diameter sufficient to allow the stud to pass through, and B. threaded lug nuts for receiving the stud having one end corresponding to the shape of the conical receiving end of the raised shoulder attached to said sleeve at the conical receiving section by means of a weak glue.

2. The wheel of claim 1 in combination with a bullet nosed stud having a head portion at one end for engagement in the wheel hub, a threaded shank section having threads engageable with said lug nut and a bullet nosed section at the opposite end of diameter smaller than the diameter of the lug nut threads.

* * * * *